United States Patent Office 3,462,279
Patented Aug. 19, 1969

3,462,279
FUDGE PROCESS
Bojan Vospalek, Stamford, Conn., and John D. Bornberg, Evergreen Park, Ill., assignors to Standard Brands Incorporated, New York, N.Y., a corporation of Delaware
No Drawing. Filed Apr. 12, 1966, Ser. No. 541,965
Int. Cl. A23g 3/00
U.S. Cl. 99—134                                                7 Claims

ABSTRACT OF THE DISCLOSURE

The disclosure describes a process for manufacturing fudge. A fudge mix is prepared containing sucrose and other fudge ingredients and heated with stirring to remove a portion of the moisture from the mix. The mix is cooled, beaten until there is formed between 250 and 875 sucrose crystals in a film of the mix about 0.002 inch thick ascertainable with polarized light at a magnification of 100× per 650 micron square field. The major portion of the sucrose crystals are less than 45 microns. The mix is then worked while cooling to permit uniform growth of the sucrose crystals and extruded at a temperature at which it is shape retaining.

---

This invention relates to a process for manufacturing fudge.

Fudge is generally made by first forming a mix of corn syrup and/or invert sugar, water, sucrose, milk products such as fresh milk, evaporated milk, sweetened condensed whole or skim milk, cream or butter, vegetable fat, and a whipping agent such as egg or soyalbumen if desired, and then heating this mix to a temperature of approximately 140° F. with stirring until all the ingredients are uniformly dispersed throughout. The heated mix is then transferred into an open kettle and heated at approximately 240° F. until a moisture level within the range of about 8 to 10 percent is obtained. During the heating a sufficient portion of the sugar is caramelized to provide color and flavor. The temperature of the mix in the kettle is lowered to approximately 200° F. and fondant is added while the mix is subjected to vigorous agitation to thoroughly disperse the fondant throughout the mix. The mix is then spread onto a cooling slab where it is cooled under atmospheric conditions for a period of time sufficient to obtain the desired graining or crystallization, usually for a period of from 12 to 48 hours. This cooling period will vary from batch to batch depending upon the ingredients in the mix and the relative proportions thereof, and may even vary in cases where fudge batches are prepared under identical conditions. In fact, it has been observed that in a number of instances the desired graining cannot be obtaied in a reasonable length of time. When this happens, the fudge must be reworked; i.e., incorporated into the starting mix.

It is the principal object of the present invention to provide a process of manufacturing fudge which may be adequately controlled so that products produced thereby will have substantially the same grain structure. A further object of the present invention is to provide a continuous process for the manufacture of fudge. Still a further object of the present invention is to provide a process or the manufacture of fudge wherein desired graining can be obtained without the use of a fondant.

The foregoing objects may be realized according to the process of the present invention by preparing a mix of sucrose and other fudge ingredients which are substantially completely dissolved or uniformly dispersed throughout the mix, heating the mix with stirring until the desired moisture level is obtained and cooling and beating the mix to achieve the formation of between about 250 and about 875 sucrose crystals per 650 micron square field in a film of the mix about 0.002 inch thick ascertainable with polarized light at a magnification of 100×. The major portion of the crystals should not be larger than about 45 microns. The mix is then worked while being cooled to permit uniform growth of the crystals and extruded at a shape retaining temperature.

The mix containing the desired ingredients, for example, sucrose, corn syrup, water, sweetened condensed milk, invert sugar, vegetable fat, glycerin, salt and coloring agent is heated with stirring at a temperature, preferably about 120° F., whereat they are substantially completely solubilized or uniformly dispersed throughout the mix. The mix is then heated with stirring until the desired moisture level is achieved. Advantageously, it is heated to a temperature between about 252° to about 254° F. to achieve a moisture level in the final product of between about 6 and about 8 percent and preferably about 7.6. The moisture level is determined by the "Official Methods of Analysis of The Association of Official Agricultural Chemists," ninth edition, 1960, the sample being prepared by method 29.001 and dried by method 29.006. The mix may be heated in an open kettle to drive off the moisture or in a closed vessel provided with a suitable steam outlet. In either case, during the evaporation of moisture, the mix should be vigorously agitated so that little or none of it sticks to the sides of the vessel. The mix is then cooled to a temperature in the range of between about 125° F. and about 145° F., preferably about 135° F., for instance, by passing it over a cooling wheel. Before the mix leaves the cooling wheel, flavor may be added. The mix is then transferred to a beater. The beater is provided with a water cooled jacket which controls the temperature of the mix while it is being beaten so that temperature of the mix is always maintained under about 145° F. The mix is vigorously agitated in the beater to start crystallization of the sucrose crystals and to control crystallization so that predetermined sizes and numbers thereof are formed. The size and number of sucrose crystals formed in the beater will determine the texture and grain of the final product. If the crystals formed in this step are too small or if the requisite quantity is not present, the product will be undesirably soft and too smooth in texture. For the determination of the size and number of crystals, we used a Bausch & Lomb Model LC-4 petrographic microscope equipped with a 10× eyepiece and a 10× objective. The eyepiece was fitted with a graduated micrometer disc (25 equal squares) calibrated using a slide micrometer. This resulted in a calibration of 130 microns per grid space or 650 microns for the entire field. Samples of the mix were placed on slides and a film thereof 0.002 inch thick was drawn by using a piece of slotted shimming steel of this thickness. These slides were examined using polarized light. A crystal count estimate was made by counting the number of crystals in 3 squares, averaging the values and multiplying by 25 to obtain an approximation of the total number of crystals in the 650 micron square field. The crystal size estimate was made by comparing the largest crystal with the known 130 micron grid spacing and estimating the relative size of the crystal. With this method of determination, it was found that if the number of sucrose crystals is between about 250 and about 875 with a major portion thereof having a maximum size of 45 microns, the final product will have good grain and texture. However, to obtain the best products the number of the crystals formed in this step should be between about 450 and about 650 with a major portion thereof having a size between about 35 microns and about 5 microns.

Generally, the mix leaving the beater will be at a higher temperature than the mix entering the beater. The rise in temperature is due to the heat produced by the heat of crystallization of the sucrose crystals and the heat produced by the friction of the beater blades on the mix. Preferably the fudge leaving the beater is at a temperature between about 140° and about 144°.

The fudge is then cooled further to permit substantially uniform growth of the sucrose crystals and to permit the fudge to be shaped retaining after it has been extruded. During this cooling step the fudge is worked. Advantageously, this step is carried out in a separate piece of equipment like a screw conveyor where the mass is continuously worked while passing therethrough and which is provided with a source of cool air that passes countercurrent to the direction of the movement of the fudge. Advantageously, the fudge is cooled to a temperature between about 75° and 80° F. in this step. The fudge is then extruded.

In order to more clearly describe the nature of the present invention, a specific example will hereinafter be given. It should be understood, however, that this is done solely by way of example and is intended neither to delineate the scope of the invention nor limit the ambit of the appended claims.

EXAMPLE 38 to 40 parts of sucrose, 25 to 30 parts of 43 Baumé, 52 D.E. corn syrup, 10 to 15 parts sweetened condensed skim milk, 3 to 5 parts invert sugar, 3 to 4 parts hydrogenated vegetable fat, about 1 part glycerin, about 0.5 part salt, coloring agent and 18 percent water are metered into a tank where they are mixed for at least one hour at a temperature of 120° F. to insure that they are thoroughly dispersed or solubilized. This mix is transferred into steam jacketed kettles, heated to 170° F. and transferred into holding kettles and subsequently into feed kettles. From the feed kettles the mix goes into heat-exchange cookers where the mix is cooked at a a temperature between about 251° and about 255° F. until a moisture level of about 7.6% is achieved. The mix is then cooled to about 135° F. by passing it over a cooling wheel. Prior to the fudge leaving the cooling wheel, flavor is added. The mix is then transferred into a beater having a water cooled jacket where it is beaten to achieve the formation of between about 250 and 875 sucrose crystals in a film of the mix about 0.002 inch thick ascertainable with polarized light at a magnification of 100× per 650 micron square field. The mix exiting the beater is at a temperature between about 140° and 144° F. and then is transferred into a series of screw conveyors which are provided with a source of cool air that passes countercurrent to the direction of the movement of the fudge. The fudge is worked in these screw conveyors to permit uniform growth of the crystals, and is cooled to a temperature between about 75° and about 80° F. The fudge is then extruded.

What we claim is:

1. A proces for manufacturing fudge comprising preparing a mix of sucrose and other fudge ingredients which are substantially completely dissolved or uniformly dispersed throughout the mix, heating the mix with stirring until the desired moisture level is obtained, cooling and beating the mix to achieve the formation of between about 250 and about 875 sucrose crystals in a film of the mix about 0.002 inch thick ascertainable with polarized light at a magnification of 100× per 650 micron square field, the major portion of the sucrose crystals being less than 45 microns, working the mix while cooling to permit substantially uniform growth of said crystals and extruding the mix at a temperature at which it is shape retaining.

2. A process for manufacturing fudge as defined in claim 1, wherein the number of sucrose crystals formed is between about 450 and about 650 with the major portion thereof having a size between about 35 micron and about 5 microns.

3. A process for manufacturing fudge as defined in claim 2, wherein the mix is cooled to a temperature in the range between about 125° and about 145° F. prior to beating.

4. A process for manufacturing fudge as defined in claim 3, wherein the fudge after beating is in the temperature range between about 140° and about 145° F.

5. A process for manufacturing fudge as defined in claim 3, wherein the temperature is about 135° F.

6. A process for manufacturing fudge as defined in claim 5, wherein the mix is prepared at about 120° F. and is heated at a temperature between about 252° F. and about 254° F. for a time sufficient to reduce the moisture level to between about 6 and about 8 percent.

7. A process for manufacturing fudge as defined in claim 6, wherein the mix is extruded at a temperature within the range between about 75° and about 80° F.

References Cited

UNITED STATES PATENTS 2,297,764   10/1942   Holven et al. _____ 99—134

A. LOUIS MONACELL, Primary Examiner

W. A. SIMONS, Assistant Examiner